United States Patent
Seiler et al.

(10) Patent No.: US 9,442,477 B2
(45) Date of Patent: Sep. 13, 2016

(54) AUTOMATION TECHNOLOGY AUTARKIC FIELD DEVICE

(75) Inventors: Christian Seiler, Auggen (DE); Dirk Rapp, Steinen (DE)

(73) Assignee: Endress + Hauser Process Solutions AG, Reinach (DE)

( * ) Notice: Subject to any disclaimer, the term of this patent is extended or adjusted under 35 U.S.C. 154(b) by 1590 days.

(21) Appl. No.: 12/451,934

(22) PCT Filed: Oct. 9, 2009

(86) PCT No.: PCT/EP2009/063181
§ 371 (c)(1),
(2), (4) Date: Mar. 8, 2011

(87) PCT Pub. No.: WO2010/049253
PCT Pub. Date: May 6, 2010

(65) Prior Publication Data
US 2011/0148511 A1 Jun. 23, 2011

(30) Foreign Application Priority Data
Oct. 27, 2008 (DE) ........................ 10 2008 043 199

(51) Int. Cl.
*G05F 1/10* (2006.01)
*G05B 19/042* (2006.01)

(52) U.S. Cl.
CPC . *G05B 19/0423* (2013.01); *G05B 2219/25006* (2013.01); *G05B 2219/25198* (2013.01); *G05B 2219/25282* (2013.01); *G05B 2219/25428* (2013.01)

(58) Field of Classification Search
CPC ................................................ G05B 19/0423
See application file for complete search history.

(56) References Cited

U.S. PATENT DOCUMENTS

| | | | | |
|---|---|---|---|---|
| 7,630,844 B2 * | 12/2009 | Lalla | ...................... | G01D 21/00 323/209 |
| 7,844,410 B2 * | 11/2010 | Lalla | ...................... | G01F 1/8409 323/209 |
| 8,970,203 B2 * | 3/2015 | Idiart | ................... | H03M 1/1071 324/76.44 |

(Continued)

FOREIGN PATENT DOCUMENTS

| | | |
|---|---|---|
| DE | 197 23 645 | 12/1998 |
| DE | 199 25 943 | 12/2000 |

(Continued)

OTHER PUBLICATIONS

Machine Translation of DE 102006009979A1 filed on Sep. 6, 2007.*

(Continued)

*Primary Examiner* — Jermele M Hollington
(74) *Attorney, Agent, or Firm* — Bacon & Thomas, PLLC

(57) ABSTRACT

An automation technology, autarkic, field device, which is connected via two connecting terminals to an I/O module. The I/O module is embodied as a 4-20 mA/HART I/O module. The I/O module is associated with a controllable energy source via which the field device is supplied with energy. An electrical current measuring unit is provided which ascertains the electrical current supplied by the energy source. In the I/O module, internal resistors are provided, across which occurs in each case a voltage drop dependent on the flowing electrical current. A control unit is provided, which operates the energy source in such a way that a predetermined terminal voltage is supplied on the connecting terminals for powering the field device.

14 Claims, 1 Drawing Sheet

(56) References Cited

U.S. PATENT DOCUMENTS

| | | | |
|---|---|---|---|
| 2006/0161359 A1* | 7/2006 | Lalla | G01D 9/005 702/65 |
| 2008/0012428 A1* | 1/2008 | Lalla | G01D 21/00 307/97 |
| 2008/0015799 A1* | 1/2008 | Lalla | G01F 1/8409 702/65 |
| 2008/0174178 A1 | 7/2008 | Jakobsson | |
| 2010/0201342 A1* | 8/2010 | Thoren | G05B 19/042 323/318 |
| 2010/0214091 A1* | 8/2010 | Thoren | G04L 12/40039 340/539.1 |
| 2013/0176036 A1* | 7/2013 | Grozinger | G01R 27/2611 324/655 |
| 2014/0070609 A1* | 3/2014 | Fiedler | G05B 19/4185 307/21 |

FOREIGN PATENT DOCUMENTS

| | | |
|---|---|---|
| DE | 103 09 125 | 9/2004 |
| DE | 10309125 | 9/2004 |
| DE | 10 2004 020 393 | 11/2005 |
| DE | 10 2005 027 047 | 12/2006 |
| DE | 10 2005 063 054 | 7/2007 |
| DE | 10 2006 009 979 | 9/2007 |
| DE | 10 2006 062 603 | 7/2008 |

OTHER PUBLICATIONS

Machine Translation of DE 10309125A1 filed on Sep. 16, 2004.*

* cited by examiner

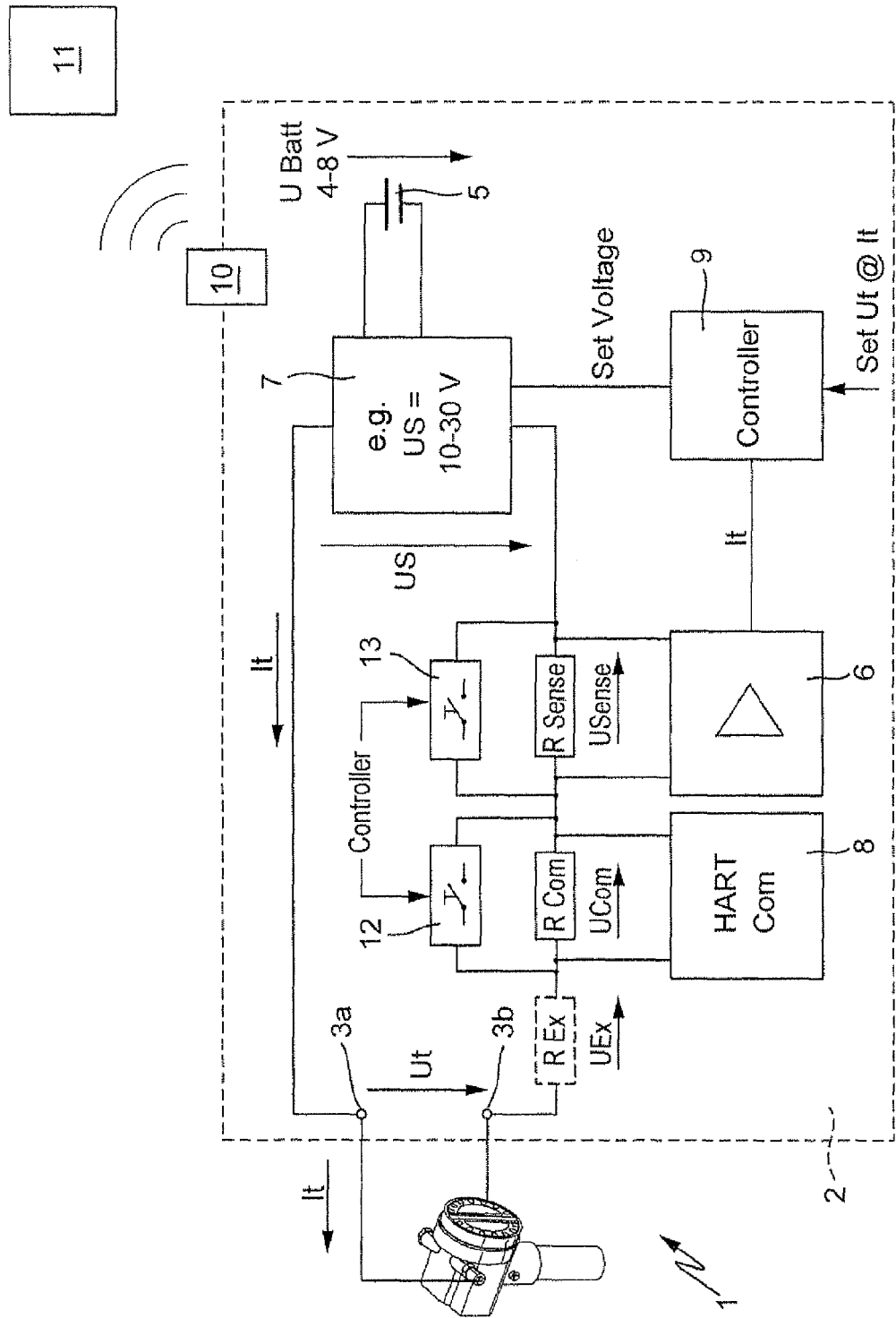

AUTOMATION TECHNOLOGY AUTARKIC FIELD DEVICE

TECHNICAL FIELD

The invention relates to an autarkic field device of automation technology.

BACKGROUND DISCUSSION

In process automation technology, as well as manufacturing automation technology, field devices are often employed, which serve to register and/or influence process variables. For the registering of process variables, measuring devices are used, which, in each case, exhibit at least one sensor and one measurement transmitter. Such measuring devices include, for example, fill-level measuring devices, flow measuring devices, pressure and temperature measuring devices, pH-redox potential measuring devices, electrical conductivity measuring devices, etc., which ascertain the respective process variables of fill-level, flow, pressure, temperature, pH-value and conductivity. For influencing process variables, actuators are used, for example valves or pumps, via which the flow of a fluid in a section of pipeline or the fill-level in a container can be changed.

In principle, all devices which are employed near the process and which deliver or work with process-relevant information are referred to as field devices. In addition to the aforementioned measuring devices/sensors and actuators, such units that are directly connected to a fieldbus and which serve to communicate with superordinated units (e.g. remote I/Os, gateways, linking devices and wireless adapters) are also generally referred to as field devices. A large number of these devices are produced and sold by the Endress+Hauser Group.

In modern industrial facilities, field devices are, as a rule, connected with superordinated units via fieldbus systems (e.g. Profibus®, Foundation Fieldbus®, HART®, etc.). Normally, the superordinated units involve control systems or control units, for example a PLC (programmable logic controller). The superordinated units are used, for example, in process controlling, process visualizing, process monitoring as well as in the start-up of the field devices. The measured values registered by the field devices—especially by the sensors—are transmitted via the connected bus system to a superordinated unit, or, as the case may be, to several superordinated units. Additionally, a transfer of data from the superordinated unit to the field devices via the bus system is necessary; this is used especially in the configuring and parametering of field devices or for diagnostic purposes. Generally speaking, the field device is serviced from the superordinated unit via the bus system.

In addition to a hardwired data transmission between the field devices and the superordinated unit, the possibility of a wireless data transmission also exists. In particular, in the case of the bus systems Profibus®, Foundation Fieldbus® and HART®, a wireless data transmission via radio is specified. Additionally, radio networks for sensors are more precisely specified in the standard IEEE 802.15.4.

For the realization of a wireless transmission of data, field devices are embodied, for example, as radio-field devices. As a rule, these exhibit a radio unit and an electrical current source as integral components. In such a case, the radio unit and the electrical current source can be provided in the field device itself, or in a radio module which is permanently connected to the field device. Through the electrical current device, an autarkic energy supply for the field device is made possible.

Alternatively, field devices without radio units—i.e. the current installed base in the field—are upgraded to a radio-field device through the attachment of a wireless adapter which features a radio unit. A corresponding wireless adapter is described, for example, in the publication, WO 2005/103851 A1. The wireless adapter is, as a rule, connected to a fieldbus communication interface of the field device in a detachable manner. Via the fieldbus communication interface, the field device can transmit data over the bus system to the wireless adapter, which then transmits this via radio to the target location. Conversely, the wireless adapter can receive data via radio and forward it over the fieldbus communication interface to the field device. The supplying of the field device with electrical power occurs then, as a rule, via an energy supply unit associated with the wireless adapter.

The greater part of the installed base of field devices is made up of HART-devices, which communicate with a superordinated control unit via the HART standard. In order to integrate 4-20 mA/HART into wireless networks, adapters (as previously mentioned) are employed which implement the communication link to the wireless network and, in such case, also cyclically-automatedly register measured values from the connected field device. Suitable adapters have at their disposal an autarkic energy source (e.g. batteries), which supplies both the adapter as well as the connected field device with energy. For powering the connected field device, the adapter exhibits a power supply stage, which supplies the required terminal voltage at the appropriate 4-20 mA measuring and supply current. Due to the relatively high energy consumption of today's 4-20 mA field devices, such devices are normally not continually supplied with energy, but only according to need. This clocked operation of the field device is also known as duty cycle operation.

Field devices require, at a defined measurement, or supply, current, a defined minimum terminal voltage for regular operation. The measurement, or supply, current changes dynamically during operation. The different operating phases are listed below:

Operating phase, "measurement with 4-20 mA output":
  Here, the electrical current changes proportional to the measured value.
Operating phase, "measurement with HART only output":
  Here, the field device is operated in multidrop mode. During operation, the electrical current is consistently set to a minimum value.
Operating phase, "start-up": Here, a deviating electrical current is present up to the ascertainment of the first measured value.

A corresponding I/O module of a wireless adapter has in the measuring loop internally various resistors, which, at constant internal supply voltage, provide for the connected measurement transmitter a terminal voltage dependent on electrical current flow. These resistors are, for example, an Ex limiting resistor, a HART communication resistor or a measuring resistor for registering the analog 4-20 mA measurement current. In order to compensate for the voltage drops caused by the internal series-connected resistors, the internal supply voltage of the power supply must be chosen in such a way that the defined terminal voltage of the field device is reached even in the case of the highest arising electrical current. The maximum arising current is the error current, which amounts to, for example, 22 mA. The listed resistors, with the exception of the Ex limiting resistor, are, furthermore, not absolutely required in every operating phase; they currently must, however, always be taken into consideration when setting the supply voltage. Due to this internal supply voltage being rigidly set for the worst-case-scenario, the available energy is not utilized efficiently. In many operating phases, a not insignificant portion of the available energy is wasted.

SUMMARY OF THE INVENTION

An object of the invention is to operate an autarkic field device in an energy-efficient manner.

The object is achieved by the features that the field device is connected via two connecting terminals to an I/O module, wherein the I/O module is embodied as a 4-20 mA/HART I/O module; wherein a controllable energy source is associated with the I/O module for supplying the field device with energy; wherein an electrical current-measuring unit is provided, which ascertains the electrical current supplied by the energy source; wherein, in the I/O module, internal resistors are provided across which, in each case, a voltage drop occurs as a function of flowing electrical current; and wherein a control unit is provided, which operates the energy source in such a way that a predetermined terminal voltage is available at the connecting terminals for powering the field device.

The internal supply voltage is, as a function of the electrical current currently available to the field device, adaptively regulated to a minimum. The product of supply voltage and supply current is thereby minimized.

An advantageous embodiment of the field device of the invention provides that the control unit operates the energy source in such a way that it dynamically regulates the terminal voltage as a function of the current flowing in each case, in such a manner that operation of the field device is assured at all times. Depending on the flow of the 4-20 mA electrical current, the current can be set in such a way that as much energy as possible is saved. Thus, field devices typically require far lower terminal voltages at high electrical currents—thus, for example, 17V at 4 mA and 11 V at 20 mA. In this connection, it is possible to store an electrical current profile for the connected field device in the I/O module. According to the stored electrical current profile, the terminal voltage is then subsequently dynamically regulated by means of the control unit.

Preferably, the electrical current measuring unit is an electrical current measuring resistor, across which the analog 4-20 mA signal representing the measured value is sensed.

It is particularly provided that the internal resistors include a communication resistor, across which the digital HART communication signal is sensed. Additionally or alternatively, the internal resistors include an electrical current limiting resistor, which is dimensioned in such a way that it meets the requirements for use of the device in an explosion hazard area.

A preferred embodiment of the field device of the invention provides that the I/O module is an adapter with an associated energy source. In particular, the adapter is embodied as a wireless adapter, which communicates with a superordinated control via an associated radio unit.

A further embodiment of the autarkic field device provides that the predetermined terminal voltage is either adjustable or fixedly predetermined.

It is furthermore provided that the field device is a measuring device for determining or monitoring a process variable, an actuator for influencing a process variable, a logging device, a remote I/O, a gateway or a linking device.

Preferably, the control device operates the field device intermittently. In such case, the energy supply is switched off or minimized during a rest phase. During an operational phase, a predetermined terminal voltage is supplied for operation of the field device.

In addition, an embodiment of the field device of the invention provides that the control unit selectively switches the communication resistor and the electrical current measuring resistor on and off according to need.

It is furthermore especially advantageous if, during the start-up of the field device, the control unit shunts the communication resistor and the electrical current measuring resistor until the field device is ready for operation. The energy efficiency of the field device is thereby further increased.

Should the field device solely supply an analog 4-20 mA signal, it is provided that the control unit continually shunts the communication resistor. If the field device supplies a digital communication signal on the basis of the HART protocol, it is then provided that the control continually shunts electrical current measuring resistor.

BRIEF DESCRIPTION OF THE DRAWINGS

The invention will now be explained in more detail by means of the appended FIG. 1, which shows a block diagram of an embodiment of the field device of the invention.

DETAILED DISCUSSION IN CONJUNCTION WITH THE DRAWINGS

The embodiment of the field device 1 shown in FIG. 1 utilizes an adaptive control of the energy supply of the field device 1. Additionally, internal measurement and/or communication resistors—Rsense, Rcom—located in the measurement branch of the I/O module are, as a function of each of the operating phases, selectively switched in or shunted, according to need. Through these two measures, as little demand as possible is made on the capacity of the energy supply unit 5, which in the case shown is a disposable battery or a battery pack.

FIG. 1 shows the terminal voltage Ut of the measurement transmitter of the field device 1, the supply voltage Us of the power supply 7, the voltage Ubatt of the energy source 5 and the voltage drops Uex, Ucom and Usense at the resistors Rex, Rcom, Rsense.

The Ex limiting resistors Rex typically have values in the range of a few 100 ohms, the HART communication resistor Rcom typically exhibits at least 250 ohms, and the measurement resistor lies between ca. 50 and 100 ohms. As a result of this, the voltage drops can, assuming the highest electrical current It (error current of 22 mA), lie in the range of 6 volts for the Ex limiting resistors, 5.5 volts for the communication resistor Rcom and 1-2 volts for the measuring resistor Rsense. If these voltage drops are added up, the supply voltage Us must be about 12V higher than the terminal voltage Ut. Even outside of an explosion hazard area, where the resistor Rex can be omitted, the supply voltage Us must still be 6V higher than the terminal voltage Ut. If one considers the ideal case, wherein the supply current It is minimal, and thus typically amounts to only 4 mA, the difference between the feed voltage Us and the terminal voltage Ut still amounts to just below 2.4 volts.

It can generally be said that high supply voltages Us are problematic for the power supply 7, if it is driven by a correspondingly low source voltage UBatt. As a result of the difference, high battery currents occur which lead to a considerable reduction of the available battery capacity and thus to a reduction in the service life of the battery or to an energy supply unit with a limited capacity.

The controller or control unit 9 of the I/O module 2 shown in FIG. 1 knows the current operating phase of the connected field device 1 or the measurement transmitter of the field device 1 at all times and ascertains the current electrical supply current It. The current, which is necessary during the start-up phase for starting-up the field device 1, is also known by the control unit. The electrical current in the start-up phase is set as a parameter.

As already mentioned before, the control unit 9 selectively switches in the measuring resistor Rsense and the communication resistor Room as a function of each operating phase of the field device 1, or it shunts one or both resistors; should one or both of the resistors not be needed during the current operating phase, a corresponding shunting occurs.

Depending on the operating phase, the resistors Room and Rsense are switched in or not. During the start-up phase of the measurement transmitter of the field device 1, neither the HART communication nor the electrical current measurement are necessary, for example. In this case, both of the resistors are, for example, shunted by the switches 12,13. This shunting lasts up until the measurement transmitter ascertains the first regular measured value.

In the operating phase "measuring with HART only output", when the field device 1 is operated in multidrop operation, the measuring resistor Rsense is not required and remains shunted. In this case the electrical current It for the respective measurement transmitter is both constant and known.

In the operating phase "Measurement with 4-20 mA only", when the HART communication and therefore also the communication resistor are not required, the communication resistor is shunted. In this case the flowing measurement current It is measured via the measuring resistor Rsense.

As already mentioned before, there is, in the invention, an adaptive regulating of the terminal voltage Ut. To this end, the control unit 9 adaptively changes the required terminal voltage Ut by altering the supply voltage Us as a function of the measured or given electrical current It, as a function of the respective operating phase of the measurement transformer of the field device 1 and as a function of the switch states of the resistors Rsense, Room and Rex.

A further development of the method takes into consideration measurement transmitters, which are able to operate at high electrical currents with low terminal voltages Us, but which, however, require higher terminal voltages at low electrical currents. This information can be stored in the controller in the form of a table. To give an example: at 20 mA, 10V suffice, whereas, at 4 mA, 16V must be set as the terminal voltage Us by means of the control unit 9.

The invention claimed is:

1. An automation technology, autarkic, field device connected via two connecting terminals to an I/O module; wherein the I/O module is embodied as a 4-20 mA/HART I/O module, comprising:
   a controllable energy source, via which the field device is supplied with energy;
   an electrical current measuring unit, which ascertains electrical current supplied by said controllable energy source;
   internal resistors across which occurs in each case a voltage drop dependent on electrical current; and
   a control unit, which operates said controllable energy source in such a way that a predetermined terminal voltage is supplied to the connecting terminals for powering the field device, wherein:
   said control unit operates said controllable energy source in such a way that it dynamically so controls the terminal voltage as a function of the electrical current flowing in each case, that, at minimum energy consumption, correct operation of the field device is assured at all times.

2. The field device as claimed in claim 1, wherein:
said electrical current measuring unit includes an electrical current measuring resistor as one of said internal resistors, via which the analog 4-20 mA signal is sensed.

3. The field device as claimed in claim 1, wherein:
said internal resistors include a communication resistor, via which a digital communication signal is sensed.

4. The field device as claimed in claim 1, wherein:
said internal resistors include an electrical current limiting resistor, which is dimensioned in such a way that it meets requirements for use of the field device in an explosion hazard area.

5. The field device as claimed in claim 1, wherein:
said I/O module is an adapter with said controllable energy source.

6. The field device as claimed in claim 1, wherein:
said I/O module is a wireless adapter, which communicates with a superordinated controller or another radio field device via an associated radio unit.

7. The field device as claimed in claim 1, wherein:
said predetermined terminal voltage is adjustable or fixedly predetermined.

8. The field device as claimed in claim 1, wherein:
the field device is a measuring device for determining and/or monitoring a process variable, an actuator for influencing a process variable, a logging device, a remote I/O, a gateway or a linking device.

9. The field device as claimed in claim 1, wherein:
said control unit intermittently operates the field device and switches off, or minimizes, energy supply during a resting phase, and during an operating phase supplies said predetermined terminal voltage for powering the field device.

10. The field device as claimed in claim 1, wherein:
said control unit selectively switches the communication resistor of said internal resistors and the electrical current measurement resistor of said internal resistors in and out.

11. The field device as claimed in claim 1, wherein:
said control unit shunts the communication resistor of said internal resistors and the electrical current measuring resistor of said internal resistors during the start-up of the field device until the field device is ready for operation.

12. The field device as claimed in claim 1, wherein:
said control unit continuously shunts the communication resistor of said internal resistors when the field device is supplying an analog 4-20 mA signal.

13. The field device as claimed in claim 1, wherein:
said control unit continuously shunts the electrical current measuring resistor of said internal resistors when the field device is supplying a digital communication signal on the basis of the HART protocol.

14. The field device as claimed in claim 1, wherein:
said energy source is a disposable battery, a fuel cell, a solar cell or a rechargeable battery.

* * * * *